United States Patent [19]
Hatfield

[11] Patent Number: 5,704,211
[45] Date of Patent: Jan. 6, 1998

[54] GAS TURBINE ENGINE WITH RADIAL DIFFUSER

[75] Inventor: John E. Hatfield, Warwickshire, England

[73] Assignee: Rolls-Royce plc, London, England

[21] Appl. No.: 783,748

[22] Filed: Jan. 16, 1997

Related U.S. Application Data

[62] Division of Ser. No. 491,405, Jun. 19, 1995, Pat. No. 5,626,018.

[30] Foreign Application Priority Data

Jul. 12, 1994 [GB] United Kingdom .................. 9414018

[51] Int. Cl.$^6$ .............................. F02C 7/00; F04D 29/54
[52] U.S. Cl. ............................ 60/726; 60/751; 415/208.2
[58] Field of Search .................. 60/726, 751; 415/143, 415/146, 179, 199.6, 207, 208.2, 208.3, 208.4, 208.5, 211.1, 211.2

[56] References Cited

U.S. PATENT DOCUMENTS

| 3,552,877 | 1/1971 | Christ . | |
|---|---|---|---|
| 4,455,121 | 6/1984 | Jen . | |
| 5,564,898 | 10/1996 | Richards et al. | 415/208.2 |

FOREIGN PATENT DOCUMENTS

| 2235125 | 2/1974 | Germany . |
| 215474 | 6/1941 | Switzerland . |
| 763058 | 12/1956 | United Kingdom . |
| 2096242 | 10/1982 | United Kingdom . |
| 2176539 | 12/1986 | United Kingdom . |
| 2242930 | 10/1991 | United Kingdom . |

*Primary Examiner*—Louis J. Casaregola
*Attorney, Agent, or Firm*—Cushman Darby & Cushman Intellectual Property Group of Pillsbury Madison & Sutro LLP

[57] ABSTRACT

A gas turbine engine with first and second axial flow compressors and an intercooler therebetween is provided with a diffuser to diffuse the air flow leaving the downstream end of the first axial flow compressor at a first radial distance from the axis to the upstream end of the intercooler at a second radial distance from the axis. The diffuser comprises a first radially extending wall, a second radially extending wall and a plurality of diffuser vanes extending therebetween which define a plurality of generally radially extending diffusing passages. The vanes are wedge shaped. This arrangement provides diffusion in a short axial length.

4 Claims, 2 Drawing Sheets

GAS TURBINE ENGINE WITH RADIAL DIFFUSER

This is a division of application Ser. No. 08/491,405, filed Jun. 19, 1995 U.S. Pat. No. 5,626,018.

The present invention relates to gas turbine engines, and in particular to gas turbine engines with axial flow compressors.

In gas turbine engines with axial flow compressors it is often necessary to transfer the fluid leaving the downstream end of one axial flow compressor at a first radial position to the upstream end of another axial flow compressor at a second radial position. The transfer of the fluid is usually achieved by locating a "swan necked" duct between the two axial flow compressors when there is sufficient axial space to do so. It is also often necessary to transfer the fluid leaving the downstream end of one axial flow compressor at a first radial position to an intercooler at a second radial position. The intercooler then supplies the cooled fluid to another axial flow compressor. The transfer of fluid from the first axial flow compressor to the intercooler is usually achieved by a "swan neck" duct.

However, where there is insufficient axial space to locate a "swan necked" duct the fluid must be transferred in some other way. If the fluid is transferred radially the pressure recovery in such a confined axial distance would very quickly overcome the momentum of the fluid flow and would produce excessive boundary layer growth and large areas of flow reversal.

The present invention seeks to provide a gas turbine engine which overcomes the above mentioned problems.

Accordingly the present invention provides a gas turbine engine having an axial flow compressor which has a downstream end at a first radial distance from the central axis of the gas turbine engine, at least one other component downstream of the axial flow compressor which has an upstream end at a second radial distance from the central axis, a diffuser is positioned in flow series between the axial flow compressor and the at least one other component, the diffuser is defined between a first radially extending wall and a second radially extending wall, a plurality of angularly spaced diffuser vanes are positioned between the first and second walls, the diffuser vanes extend generally radially to define a plurality of radially extending diffusing passages.

Preferably the diffuser vanes increase in cross-section from their radially inner ends to their radially outer ends.

Preferably the diffuser vanes are wedge shaped in cross-section.

Preferably the diffuser vanes increase in cross-section uniformly from their radially inner ends to their radially outer ends.

The at least one component may comprise a second compressor and combustion means arranged in flow series.

The at least one component may comprise an intercooler, a second compressor and combustion means arranged in flow series.

The second compressor may be an axial flow compressor.

Preferably a curved duct is provided in flow series between the first axial flow compressor and the diffuser to turn the fluid flow from an axial direction to a radial direction.

Preferably the curved duct turns the fluid flow from an axial direction to a radially outward direction.

The present invention will be more fully described by way of example, with reference to the accompanying drawings in which.

Figure 1:
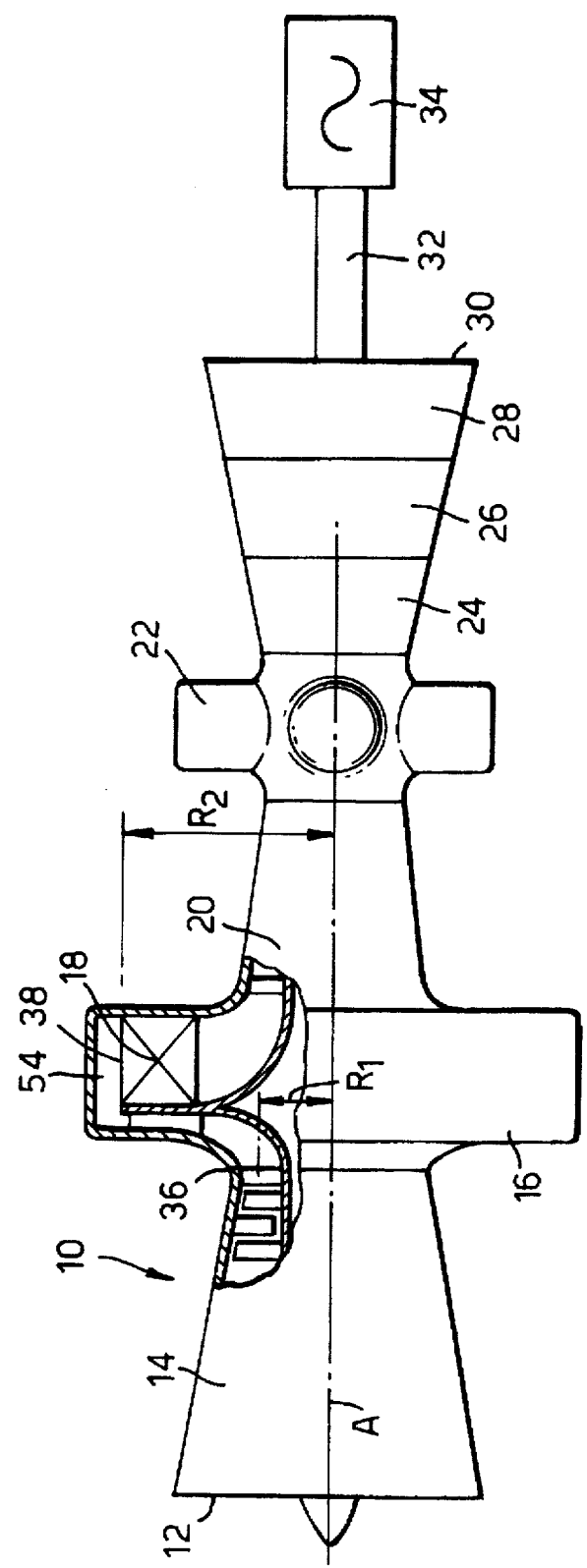
FIG. 1 is a partially cut away view of a gas turbine engine according to the present invention.

A gas turbine engine 10, shown in FIG. 1, comprises in flow series an inlet 12, a first axial flow compressor 14, a diffuser 16, an intercooler 18, a second axial flow compressor 20, a combustion system 22, a first turbine 24, a second turbine 26, a power turbine 28 and an exhaust 30. The first turbine 24 is arranged to drive the second axial flow compressor 20 via a shaft (not shown). The second turbine 26 is arranged to drive the first axial flow compressor 14 via a shaft (not shown). The power turbine 28 is arranged to drive an electrical generator 34 via a shaft 32. Alternatively the power turbine 28 may be arranged to drive a ships propeller or a pump or other device.

An intercooler 18 is provided in flow series between the first axial flow compressor 14 and the second axial flow compressor 20 so as to cool the air leaving the first axial flow compressor 14 before it enters the second axial flow compressor 20, so as to increase the efficiency of the gas turbine engine 10.

Figure 2:
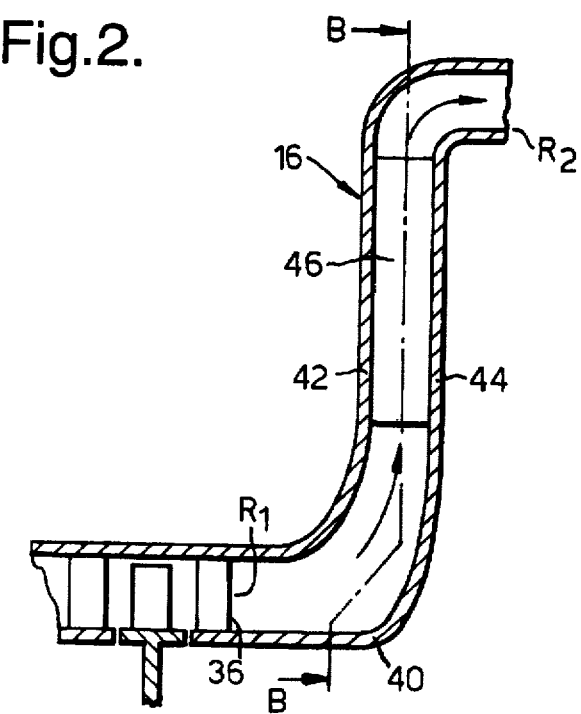
FIG. 2 is an enlarged cross-sectional view of the downstream end of the axial flow compressor and diffuser shown in FIG. 1.
Figure 3:
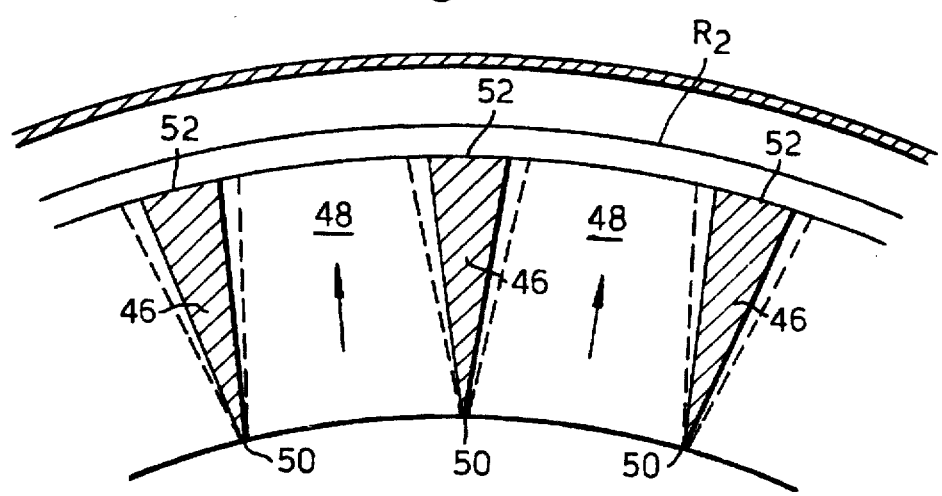
FIG. 3 is a view in the direction of arrows B in FIG. 2.
Figure 3:
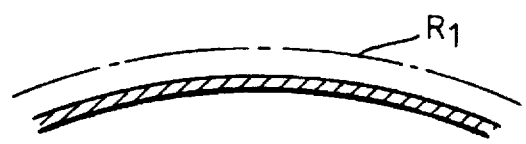

The downstream end 36 of the first axial flow compressor 14 is at a mean radial distance of $R_1$ from the central axis A of rotation of the gas turbine engine 10. The inlet 38 to the intercooler 18 is at a radial distance $R_2$ from the central axis A, and $R_2$ is greater than $R_1$. In order to transfer the fluid, air, leaving the downstream end 36 of the first axial flow compressor 14 to the inlet 38 of the intercooler 18 the diffuser 16 is provided as is shown more clearly in FIGS. 2 and 3. The diffuser 16 is defined by a first, axially upstream, radially extending wall 42 and a second, axially downstream, radially extending wall 44. The walls 42 and 44 are parallel. A number of equi-angularly spaced vanes 46 are secured to and extend between the radially extending walls 42 and 44, and the vanes 46 define a number of radially extending diffusing passages 48. For example ten vanes 46 are provided to define ten passages 48. The vanes 46 are wedge shaped in cross-section and the narrow tips 50 of the vanes 46 are arranged at their radially innermost ends and the wide parts are arranged at their radially outermost ends. The diffusing passages 48 are two dimensional and the characteristics of the diffusing passages 48 are adjustable for various applications by using wedges of different angles as shown by the broken lines in FIG. 3. The wedges may increase uniformly with straight sides or non uniformly with curved sides from the ends 50 to the ends 52. The passages 48 are rectangular in cross-section and have equal flow areas.

A curved duct 40 is provided between the downstream end 36 of the first axial flow compressor 14 and the diffuser 16 to turn the air flow from an axial direction to a radial direction.

An axial chamber 54 is provided between the diffuser 16 and the intercooler 18 to provide the remaining diffusion of the air flow before it enters the intercooler 18.

The use of the radial diffuser between the axial flow compressor and the intercooler reduces the abovementioned problems, and allows the air to be diffused in a relatively short axial length without excessive boundary layer growth and without flow reversals.

Although the invention has been described with reference to an intercooler between the two axial flow compressors, it may be possible to dispense with the intercooler and to use the diffuser simply between a first axial flow compressor and a second compressor where the downstream end of the first axial flow compressor and the upstream end of the second compressor are at different radial distances from the engine central axis. The diffuser may also be used to supply air from the axial flow compressor to other components at different radial distances from the engine central axis. The diffuser may also be used to supply the air radially inwardly rather than radially outwardly as illustrated.

I claim:

1. A gas turbine engine including an axial flow compressor and at least one other component downstream of the axial flow compressor, the gas turbine engine having a central axis, the axial flow compressor having a downstream end at a first radial distance from the central axis of the gas turbine engine, the at least one other component having an upstream end at a second radial distance from the central axis of the gas turbine engine, a radial diffuser positioned in flow series between the end of the axial flow compressor and the upstream end of the at least one other component, the radial diffuser being defined between a first radially extending wall and a second radially extending wall, a plurality of angularly spaced diffuser vanes located between the first wall and the second wall, each diffuser vane extending generally radially between its radially inner end and its radially outer end to define a plurality of radially extending diffusing passages angularly spaced about said central axis, each diffuser vane and each diffusing passage having a centerline, the center line of each diffuser vane extending from the radially inner end to the radially outer end of the respective diffuser vane, the center line of each diffuser vane lying in one of a plurality of angularly arranged planes containing the central axis and each one of the plurality of planes extending radially from the central axis, the center line of each diffusing passage lying in one of a plurality of angularly spaced planes containing the central axis and each one of the planes extending radially from the central axis.

2. A gas turbine engine as claimed in claim 1 wherein the diffusing passages are rectangular in cross section.

3. A gas turbine engine including an axial flow compressor and at least one other component downstream of the axial flow compressor, the gas turbine engine having a central axis, the axial flow compressor having a downstream end at a first radial distance from the central axis of the gas turbine engine, the at least one other component having an upstream end at a second radial distance from the central axis of the gas turbine engine, a radial diffuser positioned in flow series between the end of the axial flow compressor and the upstream end of the at least one other component, the radial diffuser being defined between a first radially extending wall and a second radially extending wall, a plurality of angularly spaced diffuser vanes located between the first wall and the second wall, each diffuser vane extending generally radially between its radially inner end and its radially outer end to define a plurality of radially extending diffusing passages angularly spaced about said central axis, each diffuser vane and each diffusing passage having a centerline, the center line of each diffuser vane extending from the radially inner end to the radially outer end of the respective diffuser vane, the center line of each diffuser vane lying in one of a plurality of angularly arranged planes containing the central axis and each one of the plurality of planes extending radially from the central axis, the center line of each diffusing passage lying in one of a plurality of angularly spaced planes containing the central axis and each one of the planes extending radially from the central axis, the at least one component comprising an intercooler, a second compressor and combustion means arranged in flow series, said second compressor being an axial flow compressor.

4. A gas turbine engine including an axial flow compressor and at least one other component downstream of the axial flow compressor, the gas turbine engine having a central axis, the axial flow compressor having a downstream end at a first radial distance from the central axis of the gas turbine engine, the at least one other component having an upstream end at a second radial distance from the central axis of the gas turbine engine, a radial diffuser positioned in flow series between the end of the axial flow compressor and the upstream end of the at least one other component, the radial diffuser being defined between a first radially extending wall and a second radially extending wall, a plurality of angularly spaced diffuser vanes located between the first wall and the second wall, each diffuser vane extending generally radially between its radially inner end and its radially outer end to define a plurality of radially extending diffusing passages angularly spaced about said central axis, each diffuser vane and each diffusing passage having a centerline, the center line of each diffuser vane extending from the radially inner end to the radially outer end of the respective diffuser vane, the center line of each diffuser vane lying in one of a plurality of angularly arranged planes containing the central axis and each one of the plurality of planes extending radially from the central axis, the center line of each diffusing passage lying in one of a plurality of angularly spaced planes containing the central axis and each one of the planes extending radially from the central axis, said at least one component comprising a second compressor and combustion means arranged in flow series, said second compressor being an axial flow compressor.

* * * * *